April 5, 1966 W. ADLER 3,244,961

SYNCHRO ERROR CORRECTING SYSTEM

Filed Sept. 30, 1963 2 Sheets-Sheet 1

INVENTOR.
WILLIAM ADLER
BY
Hopgood & Calimafde
ATTORNEYS

April 5, 1966 W. ADLER 3,244,961

SYNCHRO ERROR CORRECTING SYSTEM

Filed Sept. 30, 1963 2 Sheets-Sheet 2

INVENTOR.
WILLIAM ADLER

BY Hopgood & Calimafde
ATTORNEYS

United States Patent Office 3,244,961

Patented Apr. 5, 1966

3,244,961

SYNCHRO ERROR CORRECTING SYSTEM

William Adler, 533 Benine Road, Westbury, Long Island, N.Y.

Filed Sept. 30, 1963, Ser. No. 312,411
8 Claims. (Cl. 321—57)

This invention relates to a synchro error correcting system which corrects for known angular errors.

Synchro transmission systems have recognized advantages, particularly rapidity of operation. In one application, information is transmitted over three wires or more generally, three linkages which may include transmitting and receiving means. If original information is digital in nature and is translated to analog form before transmission, an error may occur in the final reconversion of the analog information to digital form.

This error is a time delay (or a data lag) introduced into the data by the circuitry of the receiving units. The output of digital information thus lags by a certain angle which results in a negative or positive error in the number of output bits being produced instantaneously, depending on the direction of the analog signal.

While a compensating analog signal may be introduced into the translating circuitry to correct for the known data phase error, this technique as well as other prior attempts to eliminate phase error have resulted in the use of rather complicated and expensive equipment.

This invention therefore has as an object a means for simply and conveniently correcting a known phase error in a synchro transmission system. It has a general utility as just indicated, but also a special utility in my Synchro to Digital Converter, Serial No. 312,410, filed on Sept. 30, 1963.

All of the objects, features and advantages of this invention and the manner of attaining them will become more apparent and the invention itself will be best understood by reference to the following description of an embodiment of the invention taken in conjunction with the accompanying drawing, in which FIGURE 1*a* is a diagram in block form showing a conventional synchro transmitting and receiving system;

FIGURE 1*b* shows the receiver of a similar system in which the output is in the form of two voltages;

FIGURE 2*a* shows the system of FIGURE 1*a* in terms of circuit elements in schematic form;

FIGURE 2*b* shows the circuit of FIGURE 1*b* in a more schematic form;

Briefly, in my invention, the data phase error introduced in synchro translation because of receiver circuitry, or any other error which is capable of predetermination before system operation, is understood to cause an error in continuous electrical signals from which the output is ultimately derived. These electrical signals are converted to a two-voltage (single phase) output. By adding to each of these voltages, a predetermined quantity of the other, the amplitude of the respective voltages is caused to vary which will affect the resultant phase angle of the ultimate output signal as will be described presently.

Figure 1A:
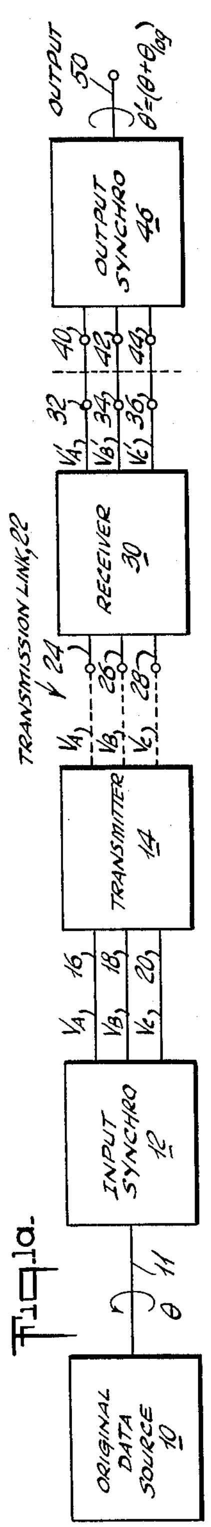

Referring now to the drawings, FIGURE 1*a* represents a conventional synchro-transmission system having an original data source 10 which may be in any appropriate form such as analog, digital, mechanical or electrical signals. These signals are converted if necessary into a signal which may be utilized as the input 11. As shown, the output is in the form of a mechanical signal which is applied over a rotating element or a shaft 11 as indicated by the quantity $\theta$. This signal is applied to an input synchro 12 which produces three electrical output signals $V_A$, $V_B$, $V_C$ over wires 16, 18 and 20. These electrical signals are known as a three-wire (single phase) output and may be appropriately applied to a transmitter 14 for retransmission over a transmission link.

The quantities $V_A$, $V_B$, $V_C$ are received at receiver-input terminals 24, 26, 28 which are coupled to the transmission link 22. Receiving elements such as antennas or conductors are not shown since such transmission links may assume any one of many conventional forms. The receiver 30 is also conventional and may include appropriate demodulators and detectors as applicable. However, the signals at the output terminals 32, 34 and 36 are indicated as $V_A'$, $V_B'$ and $V_C'$ to indicate a difference or lag in the data represented by the original signals $V_A$, $V_B$ and $V_C$, because of the circuitry of receiver 30.

In the conventional system these signals are applied to input terminals 40, 42, 44 of an output synchro 46 which produces an output over a line 50 represented by a shaft output having the form of $\theta'$ which is equal to $\theta$—$\theta$ lag. It is therefore desired to restore the signals $V_A'$, $V_B'$ and $V_C'$ to their original and accurate values $V_A$, $V_B$ and $V_C$ so as to eliminate $\theta$ lag.

Figure 1B:
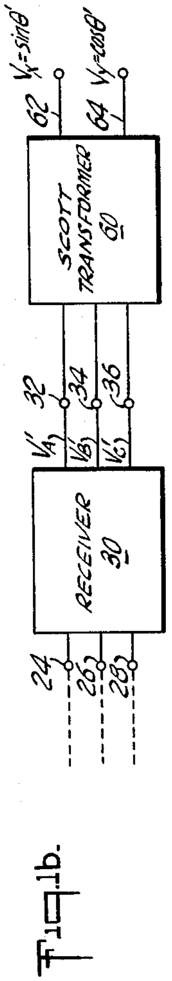

In FIGURE 1*b*, the same signals $V_A'$, $V_B'$, $V_C'$ are applied to a conventional Scott transformer 60 producing a two-voltage output over lines 62 and 64. The outputs on terminals 62 and 64 are represented by the quantities $V_x$ and $V_y$ respectively. Outputs $V_x$ and $V_y$ are proportional to sin $\theta'$ or cosine $\theta'$ respectively. Here again, the error caused by the $\theta$ lag signal is reflected in the amplitudes of the two-voltage outputs.

Figure 2A:
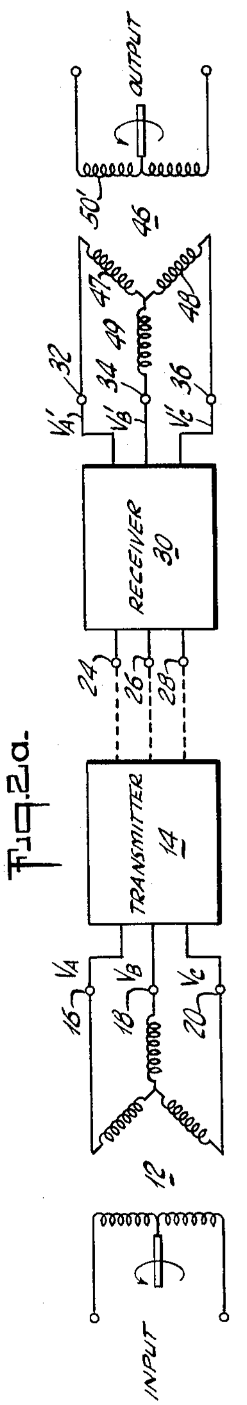

In FIGURE 2*a*, the original data source is shown applied to the input coil of a synchro transmitter. The input data causes the shaft indicated by the solid line 11 to rotate in accordance therewith. The entire transmitting synchro is indicated by the number 12 and the stator coils are shown in conventional Y-shaped connection having output terminals 16, 18 and 20. Similarly, the receiving synchro has coils 47, 48 and 49 in Y-shaped connection, the center leg (coil 49) being connected to the output 34 of the receiver. An output signal may be derived from an output coil 50' which has coupled to it rotating shaft 50, all of which is conventional, as will be understood by those skilled in the art.

Figure 2B:
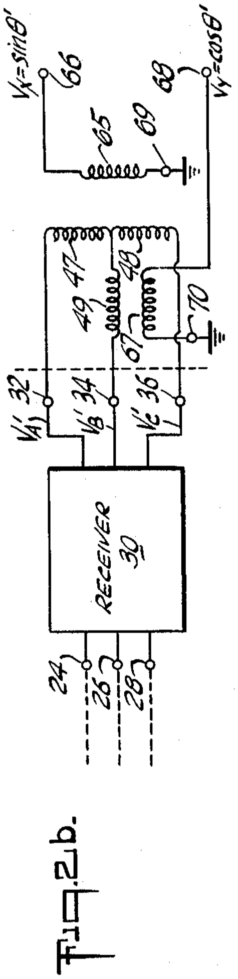
Figure 3:
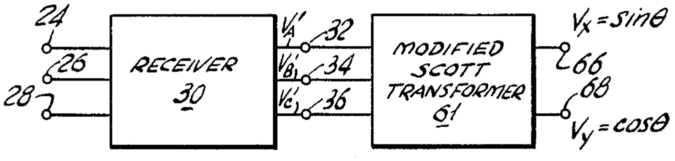
FIGURE 3 is a block diagram of my invention showing a two-voltage output.

In FIGURE 2*b*, the schematic of the conventional Scott transformer is shown. The coils 47 and 48 have magnetically coupled thereto an output coil 65, one terminal of which is grounded at 69, the other terminal of which is utilized as the output terminal 66. A voltage $V_x$ is produced at 66 which is proportional to sin $\theta'$. The center leg 49 has coupled to it a coil 67, one terminal of which is grounded at 70, the other terminal of which 68 is used to provide the other output at 68. Coils 49 and 67 constitute a transformer. On terminal 68, a voltage $V_y$ appears which is proportional to cos $\theta'$.

Figure 4:
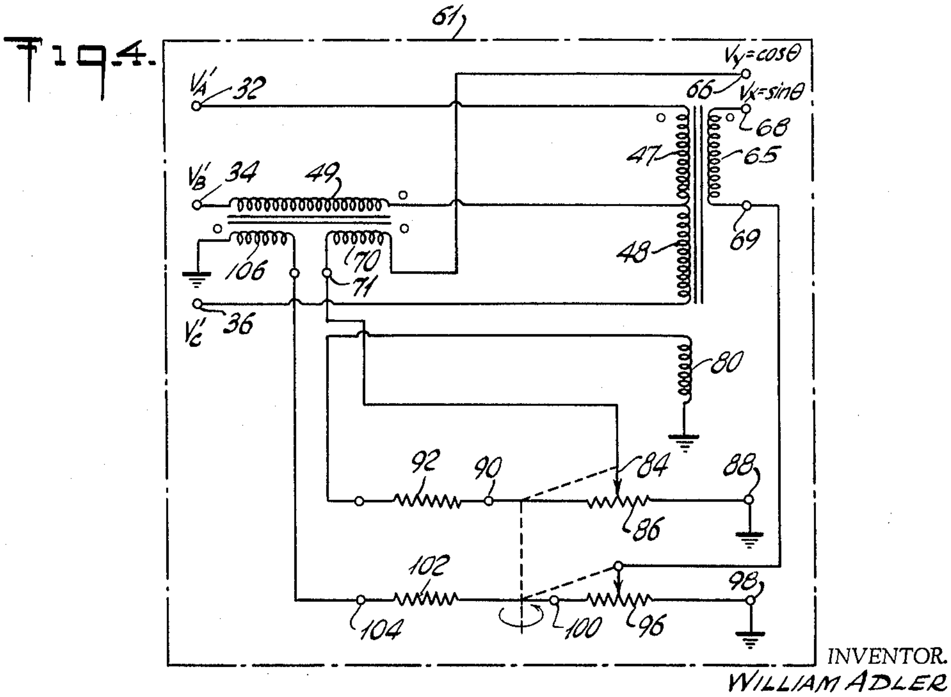
FIGURE 4 is a detailed schematic illustrating the circuitry of FIGURE 3.

In FIGURE 4, the circuitry of the modified Scott transformer is shown in detail in accordance with the principles of my invention. The input voltages $V_A'$, $V_B'$, $V_C'$ which appear on input terminals 32, 34, 36 of the modified Scott transformer 61 are connected to coils 47, 48 and 49 of the transformer connected in T configuration. Coils 47 and 48 are connected in series, the outer terminals of which are connected to input voltages $V_A'$ and $V_C'$ while the center leg (coil 49) is connected to the common terminal of coils 47 and 48 and to input voltage $V_B'$. An output coil 65, is magnetically coupled to the series coils 47 and 48.

In the conventional Scott transformer, one terminal 66 of coil 65 would constitute an output terminal to provide a voltage $V_x$ while the other terminal 69 would be connected to ground. But in the modification shown in FIGURE 4, the lower terminal 69 is connected to a movable tap 94 across a resistor 96. One terminal 98 of resistor 96 is connected to ground while the other terminal 100 is connected in series with a limiting resistor 102, the other terminal of which resistor is connected to a coil 106 which is magnetically coupled to the center leg (coil 49). One terminal of coil 106 is connected to ground while the other terminal is connected at 104 to resistor 102. The relative phasing of the coils 49, 106 and 70 is illustrated by the conventional dot. Similarly, the relative phasing of coils 47, 48 and 65 is illustrated by conventional dots, although those skilled in the art will recognize that the phasing depends upon whether a positive or negative correction is desired.

In the conventional Scott transformer, a coil 70 is magnetically coupled to the center leg of the transformer, the outer terminal of which 66 is utilized to produce the other voltage $V_y$. In this Scott transformer, terminal 71 would be connected to ground, but in the modification derived in FIGURE 4, terminal 71 of coil 70 is serially connected to variable tap 84 of resistor 86. One end of resistor 86 is grounded at 88 while the other end is serially connected to coil 80 through series resistor 92 which is also a limiting resistor. Coil 80 is magnetically coupled to the laminations or the flux path of coils 47 and 48. The dotted lines indicate that variable arms 84 and 94 are coupled together for simultaneous movement producing linear changes.

*Operation*

Actually, $$(1)\quad V_x=\sin\theta'=\sin(\theta+\theta_{lag})$$
$$V_y=\cos\theta'=\cos(\theta+\theta_{lag})\quad \text{(FIGURE 2}b\text{)}$$

Expanding these equations, we find $$(2)\quad V_x=\sin\theta'=[\cos\theta_{lag}]\sin\theta+[\sin\theta_{lag}]\cos\theta$$
$$V_y=\cos\theta'=[-\sin\theta_{lag}]\sin\theta+[\cos\theta_{lag}]\cos\theta$$

The above analysis indicates that suitable corrections in data angle maye be introduced by employing fractional amounts of the relative sin $\theta$ and cos $\theta$ voltages and adding such amounts in accordance with the equations illustrated to respective output voltages.

Referring again to FIGURE 4, it will be apparent that the voltage across coil 106 which is coupled to center leg 49 is proportional to the voltage ($V_y$) representing cos $\theta$. A predetermined amount of the voltage across coil 106 is picked up by arm 94 and is added in series to the voltage appearing across coil 65 so that the output $V_x$ constitutes a sum of two voltages, one of which is proportional to the sin $\theta$, the other of which is a predetermined fractional amount of cosine $\theta$.

Also, it will be apparent that the voltage across coil 80 (which is magnetically coupled to the coils 47 and 48) has impressed across it a voltage proportional to sin $\theta$. This voltage component appears across resistor 86. Thus, added to the component proportional to cos $\theta$ appearing across coil 70, is a sin $\theta$ voltage component tapped off at 84. Thus, the output voltage $V_y$ has two components, one of which is proportional to cos $\theta$, while the other of which is proportional to sin $\theta$.

Therefore, by controlling the arms of resistances 86 and 96, a sufficient amount of lead or lag angles may be introduced to provide correction in the output signals.

Figure 5:
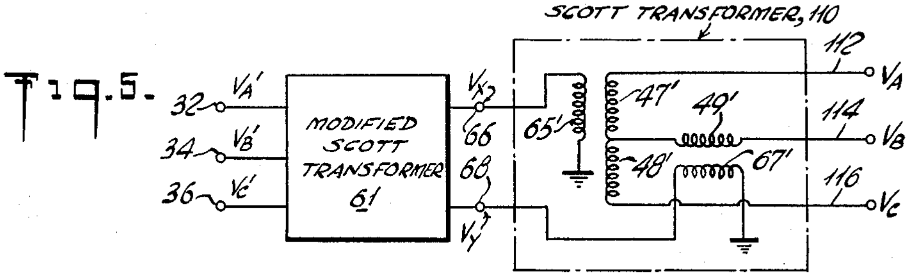
FIGURE 5 is a partially schematic diagram illustrating the application of my invention to produce three-wire output.

In the circuit of FIGURE 4, the three-wire voltages are employed to produce a two-voltage output which is applicable to the system described in my above mentioned co-pending application. It it is desired to produce a three-wire output for ordinary synchro use, then the circuit of FIGURE 5 comprising a two transformer network may be utilized. It will be recognized that the terminals 66, 68 correspond to those terminals of FIGURE 4 and the circuitry preceding these terminals is exactly the same as that of FIGURE 4. In order to convert the two voltages $V_x$ and $V_y$ appearing on terminals 66 and 68 to the three-wire voltages $V_A$, $V_B$ and $V_C$ (which differs from the input voltages $V_A'$, $V_B'$, $V_C'$ on terminals 32, 34, 36), a conventional Scott transformer is utilized which has an input coil 65' connected to input terminal 66. A three-coil transformer having arms 47' and 48' and a center leg 49' connected in Y configuration is coupled to input coil 65', input coil 65' coupling to arms 47' and 48'. The input voltage $V_y$ is coupled to the transformer through coil 67' which is magnetically coupled to the center leg 49'. The output voltages $V_A$, $V_B$ and $V_C$ appear on line 112, 114, 116 as will be understood.

In summary, I have provided a correcting system which is peculiarly adaptable to high-speed synchro transmission systems. While it is necessary to know the amount of phase error before adjusting the potentiometers 86 and 96, it will be understood that those skilled in the art may develop other techniques for accurately controlling the amount of resistance which is to be added. If necessary, an automatic control of the setting of arms 84 and 94 may be incorporated.

What is claimed is:

1. A system for varying the output voltage of a synchro transmission system comprising
- means for receiving as inputs predetermined input quantities,
- means for converting these input quantities to three-wire signals,
- synchro receiving means for receiving the three-wire signals and for converting such signals to a two-voltage output,
- said receiving means introducing a predetermined data error,
- said receiving means including means for correcting the output of said two-voltage signals so as to compensate for said errors comprising
- means for adding a predetermined amount of one of the output signals to the other while adding a predetermined amount of the other signal to the first in order to obtain output signals which are data compensated.

2. The system of claim 1 in which said converting and receiving means comprises
- a three-legged transformer having coils arranged in Y connection and output coils coupled to the leg and arms respectively of said Y,
- and circuit means interconnecting said output coil and transformer coils to add predetermined amounts of signals representing a first respective output to the entire of the other output,
- and means simultaneously adding a predetermined amount of the other output to the entire of the first output.

3. The system of claim 1 in which said converting and receiving means comprises
- a three-legged transformer having coils arranged in Y connection and first and second output coils coupled to the leg and arms respectively of said Y,
- and circuit means interconnecting said output coil and transformer coils to add predetermined amounts of signals representing a first respective output to the entire of the other output,
- and simultaneously adding a predetermined amount of the other output to the entire of the first output, and
- circuit means including voltage deriving means coupled respectively to said first and second output coils to couple a predetermined fractional amount of the voltage across said first output coil to said second output coil and to couple a predetermined fractional amount of the voltage across said second output coil to said first output coil,

4. A compensating device for use in correcting data errors, comprising a three-legged transformer having coils arranged in Y-connection, first and second output coils coupled to the leg and arms respectively of said Y, and means coupled to said first and second output coils to add a fraction of the output signal from said first coil to the output signal of the second coil and to add a fraction of the output signal from said second coil to the output signal of the first coil.

5. A compensating device for use in correcting data errors, comprising a three-legged transformer having coils arranged in Y-connection, first and second output coils coupled to the leg and arms respectively of said Y, and means responsive to the voltages induced across said coils providing first and second voltage increments representing fractional portions of output voltages from said first and second coils and said means including adding means for adding said first voltage increment to the output voltage from said second coil and for adding said second voltage increment to the output voltage from said first coil.

6. In a system for varying the output voltage of a synchro transmission system having means for receiving as inputs predetermined input quantities, means for converting these input quantities into three-wire signals synchro receiving means for receiving the three-wire signals and for converting such signals to a two-voltage output, in which said receiving means introduces a predetermined data error, means for correcting the output of said two-voltage signals so as to compensate for said errors comprising means for adding a predetermined amount of one of the output signals to the other while adding a predetermined amount of the other signal to the first in order to obtain output signals which are data compensated.

7. A system for varying the output voltage of a synchro transmission system comprising means for receiving as inputs predetermined input quantities, means for converting these input quantities to three-wire signals, synchro receiving means for receiving the three-wire signals and for converting such signals to a two-voltage output including first and second coil means across which are produced each of said two-output voltage signals respectively, said receiving means introducing a predetermined data error, said receiving means including means for correcting the output of said two-voltage signals so as to compensate for said errors comprising means for adding a predetermined amount of one of the output signals to the other while adding a predetermined amount of the other signal to the first in order to obtain output signals which are data compensated, including third coil means magnetically coupled to said first coil means, fourth coil means magnetically coupled to said second coil means, said first and fourth coil means being coupled by a controllable resistance means, said second and third means being coupled by a second controllable resistance means, whereby, said controllable resistances determine the relative amounts of signals added together,

8. The system of claim 7 in which means are provided for simultaneously varying said controllable resistances in corresponding linear relationship.

References Cited by the Examiner

UNITED STATES PATENTS

| | | | |
|---|---|---|---|
| 2,700,745 | 1/1955 | Depp | 318—24 |
| 2,810,102 | 10/1957 | Depp | 318—24 X |
| 2,866,969 | 12/1958 | Takeuchi | 318—24 X |
| 2,974,264 | 3/1961 | Depp | 318—24 X |

NEIL C. READ, *Primary Examiner.*

R. M. GOLDMAN, *Assistant Examiner.*